US012565191B2

(12) United States Patent
Aihara et al.

(10) Patent No.: US 12,565,191 B2
(45) Date of Patent: Mar. 3, 2026

(54) METHOD OF MAINTAINING STEERING ANGLE DURING WHEEL FLOAT

(71) Applicant: TOYOTA JIDOSHA KABUSHIKI KAISHA, Toyota (JP)

(72) Inventors: Yutaka Aihara, Gotemba (JP); Chuya Ogawa, Susono (JP); Takuro Nakamura, Kasugai (JP); Hiroaki Kawamura, Nagoya (JP); Shinichiro Noda, Toyota (JP); Takahiro Okano, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 18/647,226

(22) Filed: Apr. 26, 2024

(65) Prior Publication Data

US 2024/0409085 A1 Dec. 12, 2024

(30) Foreign Application Priority Data

Jun. 6, 2023 (JP) ................................. 2023-093181

(51) Int. Cl.
B60W 10/20 (2006.01)
B60W 30/04 (2006.01)
(Continued)

(52) U.S. Cl.
CPC .......... B60W 30/04 (2013.01); B60W 40/105 (2013.01); B60W 10/20 (2013.01);
(Continued)

(58) Field of Classification Search
CPC ............... B60W 30/04; B60W 40/105; B60W 2520/26; B60W 2520/28
See application file for complete search history.

(56) References Cited

U.S. PATENT DOCUMENTS 7,797,093 B2 * 9/2010 Tsukasaki .......... B60G 17/0162
701/1
8,255,110 B2 8/2012 Taguchi
(Continued)

FOREIGN PATENT DOCUMENTS

JP 11-245838 A 9/1999
JP 2007-216886 A 8/2007
(Continued)

*Primary Examiner* — Gonzalo Laguarda
(74) *Attorney, Agent, or Firm* — Sughrue Mion, PLLC

(57) ABSTRACT

The present disclosure relates to the control of a steering angle of a vehicle during wheel float. A vehicle control device acquires information indicating the yaw angle of the vehicle. The vehicle control device determines whether a wheel floating state in which one of a plurality of wheels of the vehicle is not in contact with the ground has occurred. When the wheel floating state has occurred, the vehicle control device determines whether a difference between the yaw angle of the vehicle before the occurrence of the wheel floating state and the yaw angle of the vehicle after the occurrence of the wheel floating state is less than or equal to a predetermined value. When the difference is less than or equal to the predetermined value, the vehicle control device maintains the steering angle of the vehicle while the wheel floating state continues.

6 Claims, 6 Drawing Sheets

(51) Int. Cl.
  B60W 40/105 (2012.01)
  B60W 30/02 (2012.01)
(52) U.S. Cl.
  CPC ......... *B60W 30/02* (2013.01); *B60W 2520/26*
    (2013.01); *B60W 2520/28* (2013.01)

(56) References Cited

U.S. PATENT DOCUMENTS

| | | | |
|---|---|---|---|
| 8,364,394 B2 | 1/2013 | Taguch | |
| 8,428,812 B2 | 4/2013 | Taguchi | |
| 8,660,778 B2 | 2/2014 | Taguchi | |
| 9,067,571 B2 | 6/2015 | Matsunaga | |
| 9,096,266 B2 | 8/2015 | Irie | |
| 9,352,779 B2 | 5/2016 | Kindo et al. | |
| 9,886,852 B2 | 2/2018 | Urano | |
| 10,048,699 B2 | 8/2018 | Inoue et al. | |
| 10,266,174 B2 * | 4/2019 | Shiraishi | B60W 10/06 |
| 2017/0313304 A1 | 11/2017 | Shiraishi et al. | |
| 2020/0348682 A1 | 11/2020 | Kamata | |

FOREIGN PATENT DOCUMENTS

| | | |
|---|---|---|
| JP | 2009-092604 A | 4/2009 |
| JP | 2017-197005 A | 11/2017 |

* cited by examiner

FIG. 1

METHOD OF MAINTAINING STEERING ANGLE DURING WHEEL FLOAT

CROSS-REFERENCE TO RELATED APPLICATION

This application claims priority to Japanese Patent Application No. 2023-093181 filed on Jun. 6, 2023, incorporated herein by reference in its entirety.

BACKGROUND

1. Technical Field

The present disclosure relates to a technique for controlling a vehicle when a wheel floats.

2. Description of Related Art

Japanese Unexamined Patent Application Publication No. 2009-092604 (JP 2009-092604 A) discloses a rollover determination device that determines the presence or absence of a rollover of a vehicle. The rollover determination device includes a detection unit for detecting one wheel of a vehicle floating from a road surface, and predicts a rolling behavior of the vehicle when the wheel is floating from the road surface.

SUMMARY

A wheel floating state may occur during travel of a vehicle due to riding on an obstacle etc. The wheel floating state refers to a state in which any one of wheels of the vehicle is floating. When the wheel floating state occurs, there is no resistance from the road surface to the floating wheel. Therefore, an unintended change in steering angle tends to occur. If the wheel lands on the road surface in a situation where such an unintended change in steering angle has occurred, the vehicle attitude may become unstable. It is one object of the present disclosure to provide a technique that can improve stability of a vehicle behavior even when a wheel floating state occurs.

A first aspect of the present disclosure relates to a vehicle control device that controls a vehicle.

The vehicle control device according to the first aspect is characterized by performing a process for determining whether a wheel floating state has occurred, the wheel floating state being a state in which one of a plurality of wheels of the vehicle is not in contact with a ground, and a process for maintaining a steering angle of the vehicle while the wheel floating state continues.

A second aspect of the present disclosure relates to a vehicle control method for controlling a vehicle.

The vehicle control method according to the second aspect is characterized by including determining whether a wheel floating state has occurred, the wheel floating state being a state in which one of a plurality of wheels of the vehicle is not in contact with a ground, and maintaining a steering angle of the vehicle while the wheel floating state continues.

According to the present disclosure, the steering angle of the vehicle is maintained while the wheel floating state continues. Since the steering angle is maintained, an unintended change in steering angle can be prevented. In this way, the stability of the vehicle behavior can be enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram illustrating a configuration example of a vehicle;

DETAILED DESCRIPTION OF EMBODIMENTS

Figures 2A, 2B:
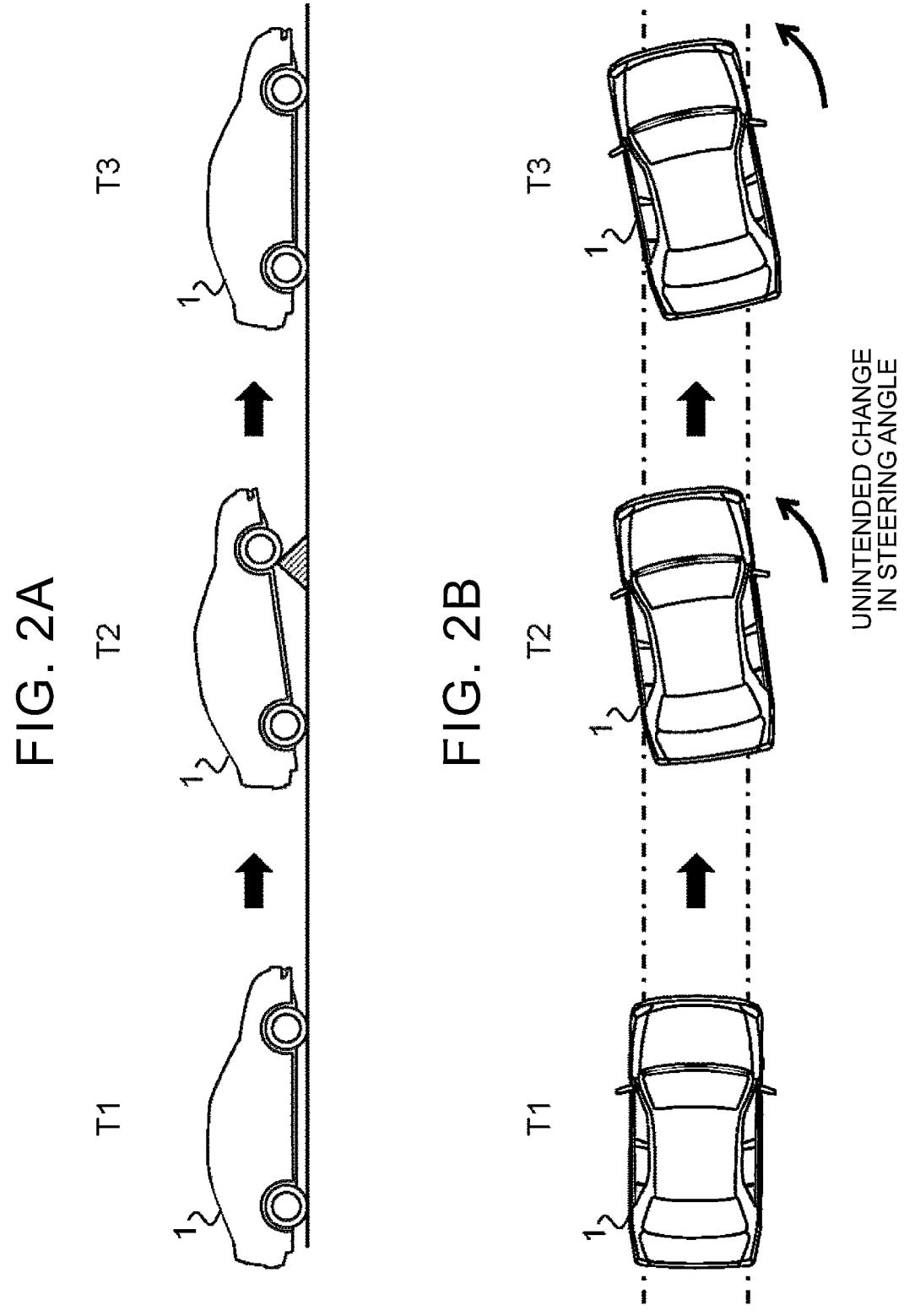
FIG. 2A is a diagram for explaining a wheel floating state.
FIG. 2B is a diagram for explaining a wheel floating state.

Embodiments of the present disclosure will be described with reference to the accompanying drawings.

1. Outline of Vehicle Control Device

Figure 1:
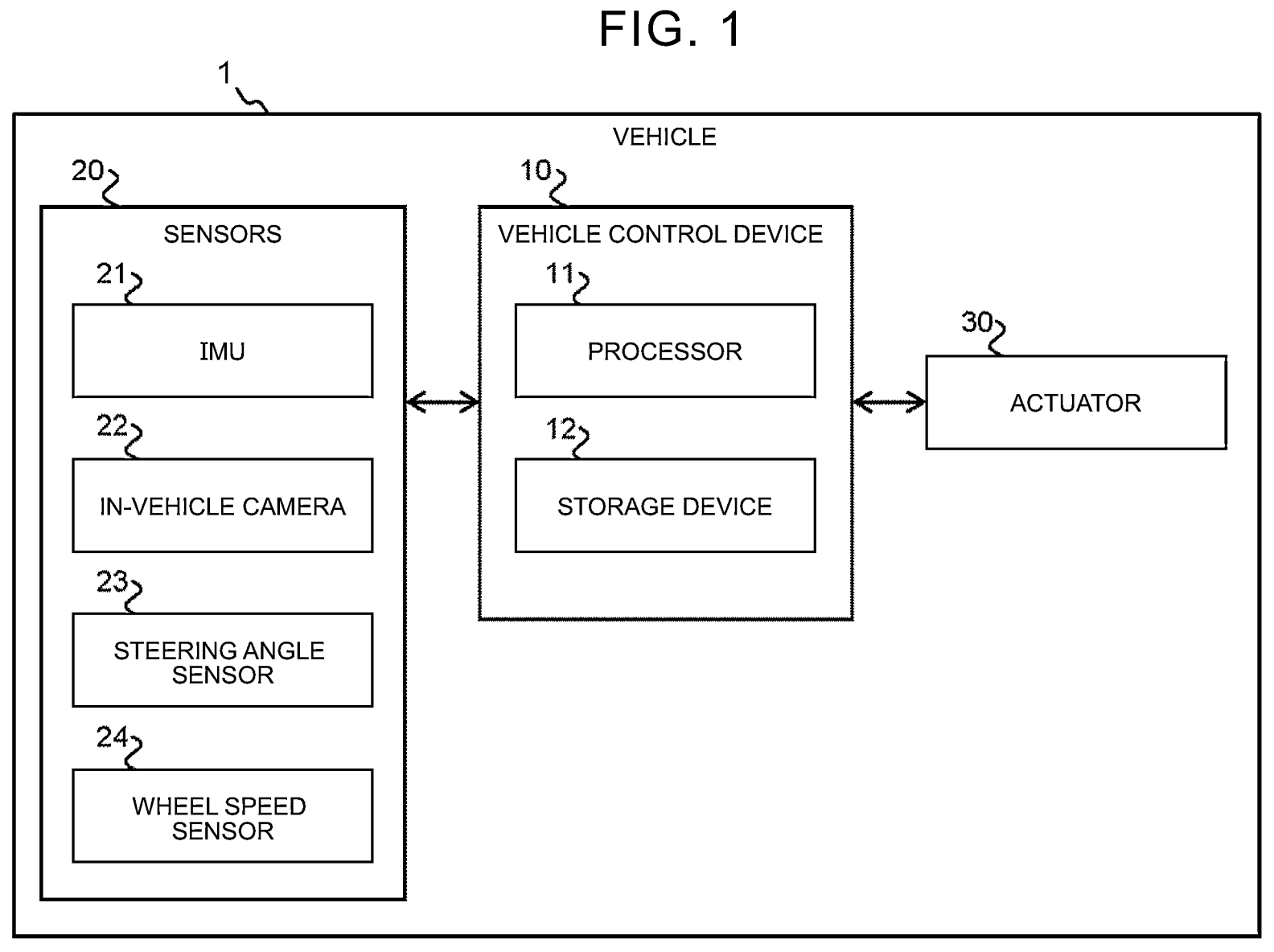

The vehicle control device according to the present embodiment controls a vehicle. FIG. 1 is a block diagram illustrating a configuration example of a vehicle 1 to which a vehicle control device 10 according to the present embodiment is applied.

The vehicle 1 includes a vehicle control device 10, sensors 20, and an actuator 30. The vehicle control device 10 is configured to communicate information with the sensors 20 and the actuator 30. For example, the vehicle control device 10 is connected to these devices via an in-vehicle network including a wire harness and the like.

The sensors 20 include an Inertial measurement unit (IMU) 21, an in-vehicle camera 22, a steering angle sensor 23, and a wheel speed sensor 24. IMU 21 is a sensor that detects three-axis angular velocity and acceleration. As a result, the attitude angle (yaw angle, roll angle, and pitch angle), the traveling direction, and the vehicle speed of the vehicle 1 can be acquired. The in-vehicle camera 22 includes, for example, a front camera that captures an image of the front of the vehicle 1 and a foot camera that captures an image of the wheels of the vehicle 1. The foot camera is mounted under the floor of the vehicle 1, and includes a ground portion where the wheel touches the ground in an imaging range. The foot camera is mounted on the vehicle 1, for example, for the purpose of detecting a failure of a wheel. The steering angle sensor 23 detects a steering angle of the vehicle 1. The wheel speed sensor 24 detects the wheel speed of each of the plurality of wheels of the vehicle 1. The sensors 20 may also include sensors for detecting suspension strokes.

The actuator 30 includes, for example, a steering motor that controls wheels.

The vehicle control device 10 comprises at least one processor 11 (hereinafter simply referred to as a processor 11) and at least one storage device 12 (hereinafter simply referred to as a storage device 12) coupled to the processor 11. The processor 11 performs various calculations necessary for processing by the vehicle control device 10. The storage device 12 stores at least one program executable by the processor 11 and various data related thereto. The program stored in the storage device 12 is executed by the processor 11, thereby realizing various kinds of processing by the vehicle control device 10. The vehicle control device 10 may include one or more ECUs (Electronic Control Unit).

When the vehicle 1 travels, a wheel floating state may occur. The wheel floating state is a state in which any one of the plurality of wheels of the vehicle 1 is not in contact with the ground, and occurs when the vehicle 1 rides on a convex portion of the ground, an obstacle, or the like. In particular, when the vehicle 1 is traveling on an unpaved road or an uneven road, the frequency at which the vehicle 1 rides on an obstacle or the like tends to increase, and a wheel floating state tends to occur.

FIGS. 2A and 2B are diagrams schematically illustrating a state of the vehicle 1 when a wheel floating state occurs. FIG. 2A illustrates a state in which the vehicle 1 is viewed from the side, and FIG. 2B illustrates a state in which the vehicle 1 is viewed from the top.

At T1 time point, the wheel floating state has not yet occurred, and the vehicle 1 is traveling in the straight direction. At the time of T2, the front wheels float away from the ground due to the vehicle 1 having ridden on the obstacle. This state is a wheel floating state. After riding over the obstacle, the front wheels contact the ground again, and at the time of T3, the wheel floating state is eliminated.

Here, while the wheel floating state continues, a change in the steering angle of the vehicle 1 that is not intended by the driver is likely to occur. This is because the resistance of the road surface to the change in the turning angle of the wheel is eliminated while the wheel floating state continues, and thus the load of the steering operation is lighter than that at the time of grounding. For this reason, the driver operates the steering more than necessary, and as a result, the vehicle 1 is easily steered in an unintended direction. In addition, since there is no resistance, it becomes difficult to grasp the sense of steering, and the like, the driver easily steers the vehicle 1 in an unintended direction.

Even at T2 point in time of FIGS. 2A and 2B, the steering angle of the vehicle 1 that was not intended by the driver has changed. Therefore, when the front wheels land on T3, there is a possibility that the vehicle 1 may be suddenly steered. In addition, due to an unintended change in the steering angle, the yaw angle of the vehicle 1 in T3 is also oriented in a direction that is different from the direction intended by the driver, that is, the straight-ahead direction. This may also lead to unstable vehicular behavior in T3.

In order to prevent such a situation, the vehicle control device 10 according to the present embodiment maintains the steering angle of the vehicle 1 while the wheel floating state continues. Since the steering angle of the vehicle 1 is maintained, a change in steering angle that is not intended by the driver is less likely to occur due to occurrence of the wheel floating state, and the vehicle behavior is less likely to become unstable.

Figure 3:
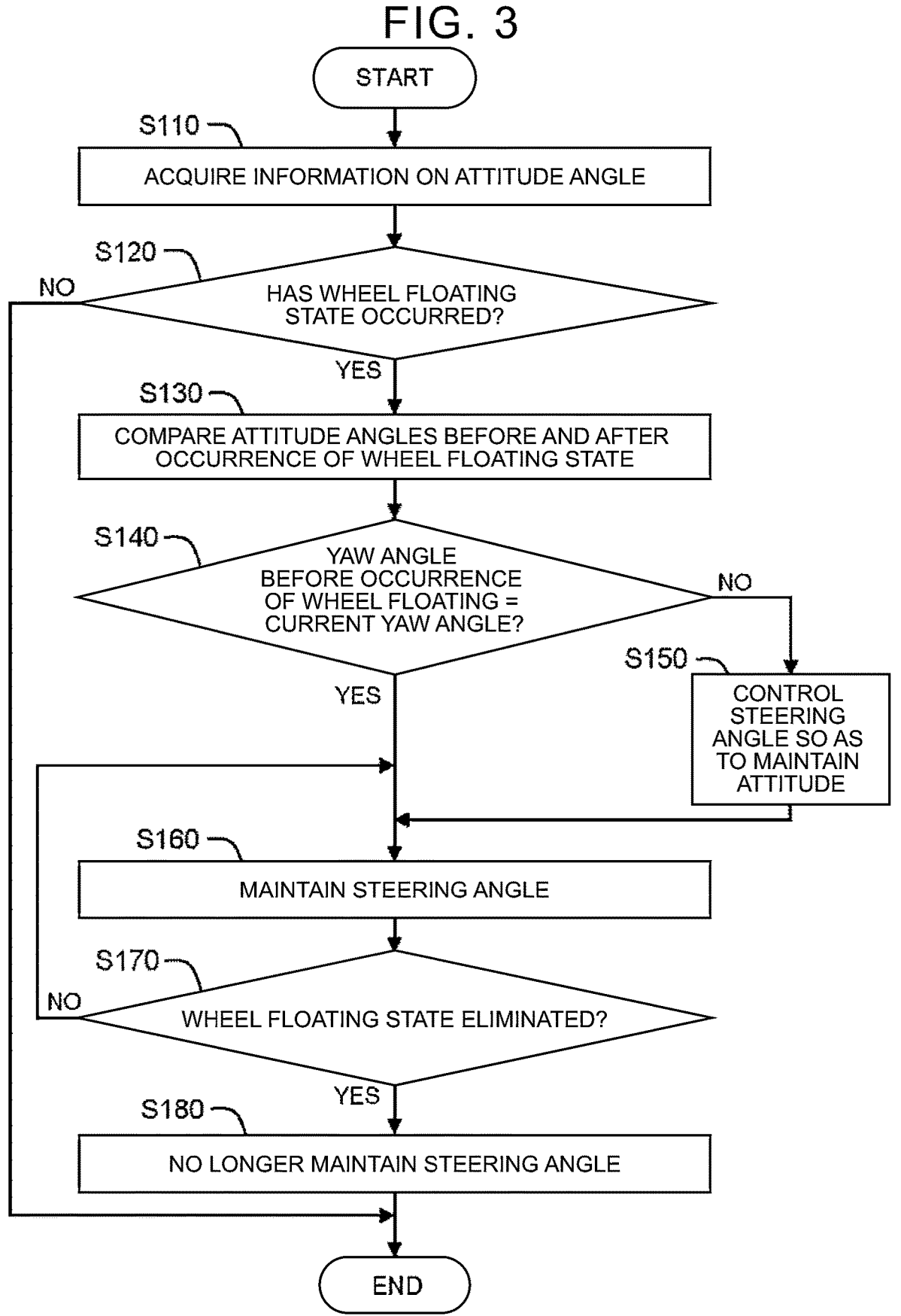
FIG. 3 is a flowchart illustrating an example of processing executed by the vehicle control device according to the present embodiment.

FIG. 3 is a flowchart illustrating a process executed by the vehicle control device 10, more specifically, a process executed by the processor 11. The flowchart illustrated in FIG. 3 starts, for example, with the start of the operation of the vehicle 1, and is repeatedly executed at predetermined intervals.

In S110, the vehicle control device 10 acquires information about the attitude angle (yaw angle, roll angle, and pitch angle) of the vehicle 1 from IMU 21. Information about the obtained attitude angle is temporarily stored by the storage device 12.

In S120, the vehicle control device 10 determines whether a wheel floating state has occurred. A method of detecting the wheel floating state by the vehicle control device 10 will be described in Chapter 2. When a wheel floating state is detected (S120; Yes), the process proceeds to S130. On the other hand, when the wheel floating state does not occur (S120; No), the process ends this time.

In S130, the vehicle control device 10 compares the attitude angle of the vehicle 1 just before the wheel floating state occurs, after the wheel floating state occurs, that is, the attitude angle of the present vehicle 1. In S130, the vehicle control device 10 acquires the attitude angle of the vehicle 1 immediately before the wheel floating state occurs from the storage device 12. Further, the vehicle control device 10 acquires the present attitude angle of the vehicle 1 from IMU 21.

In S140, the vehicle control device 10 determines the yaw angle of the attitude angle of the vehicle 1 acquired by S130. The vehicle control device 10 determines whether or not the yaw angle with respect to the reference direction changes immediately before the wheel floating state is generated and after the wheel floating state is generated. If there is no change in the yaw angle or if the change is less than the threshold (S140; Yes), the process proceeds to S160. On the other hand, if the yaw angle changes by more than the threshold (S140; No), the process proceeds to S150.

Figure 4A:
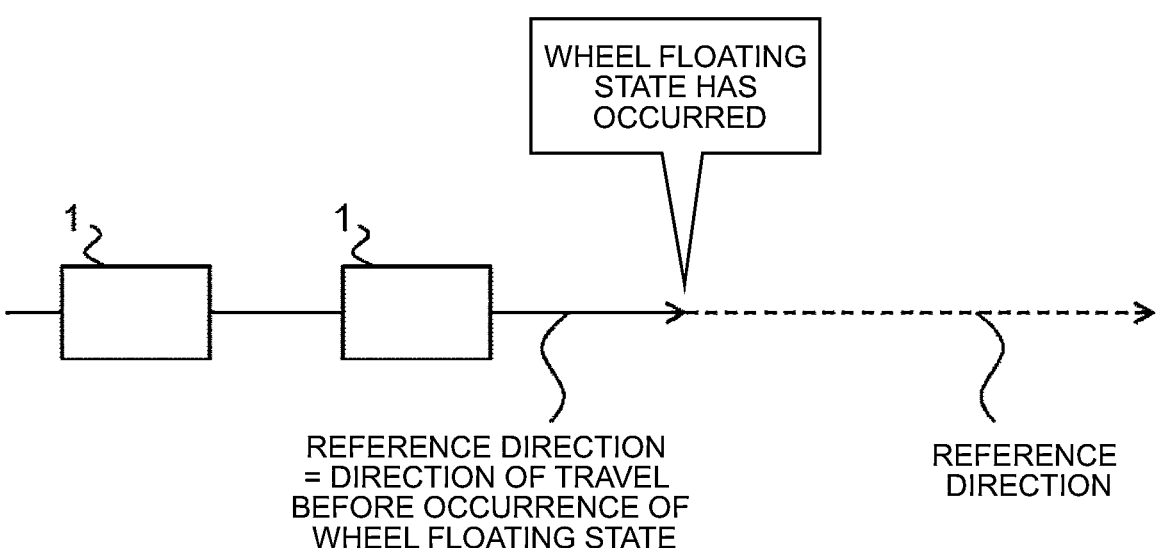
FIG. 4A is a diagram for describing a reference direction in the determination of the yaw angle performed by the vehicle control device according to the present embodiment.
Figure 4B:
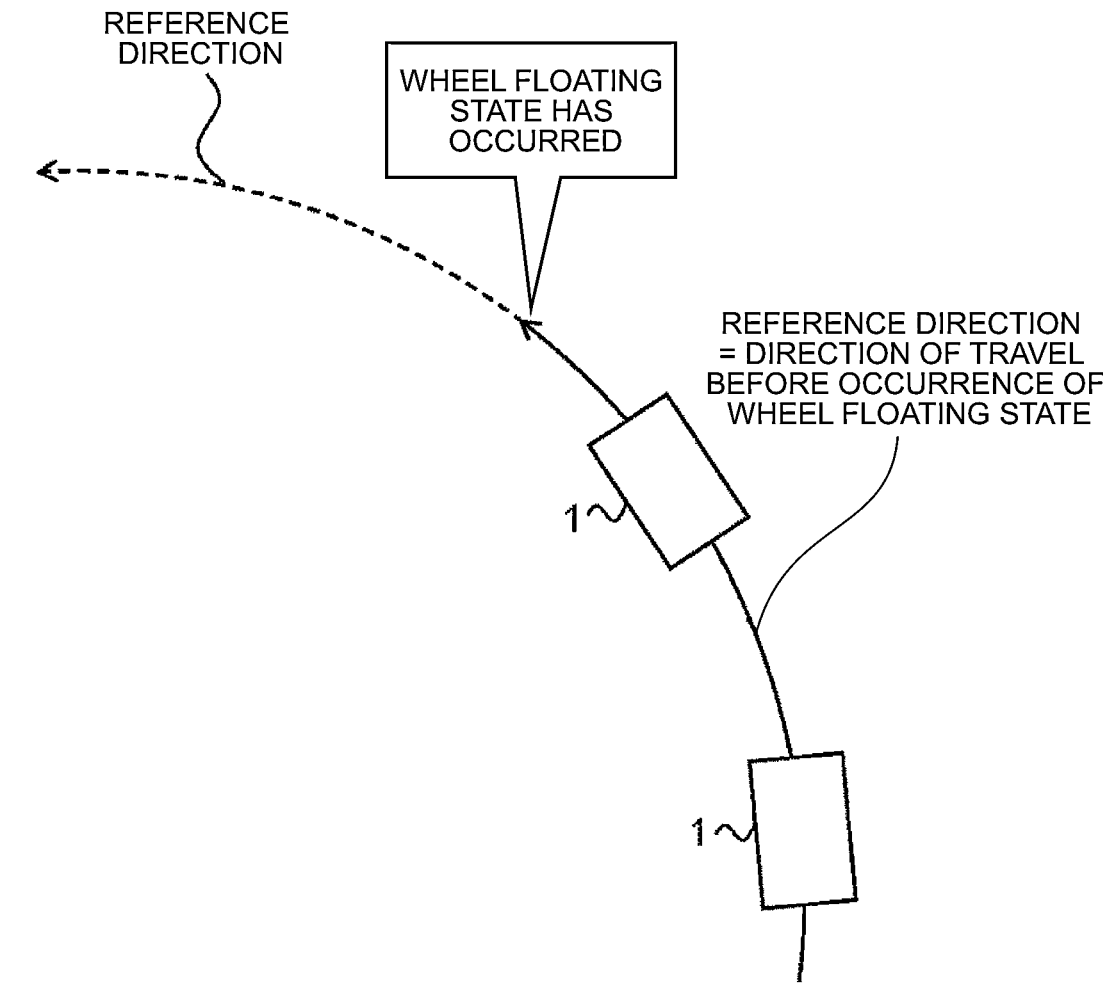
FIG. 4B is a diagram for describing a reference direction in the determination of the yaw angle performed by the vehicle control device according to the present embodiment.

Here, the reference direction is a traveling direction of the vehicle 1 intended by the driver. That is, the reference direction is the actual traveling direction of the vehicle 1 before the wheel floating state occurs. After the wheel floating state is generated, the reference direction is the traveling direction when the vehicle 1 continues the same movement as the movement until immediately before the wheel floating state is generated. For example, in a case where the vehicle 1 is traveling straight until immediately before the wheel floating state occurs as illustrated in FIG. 4A, the straight-traveling direction is a reference direction. Alternatively, as shown in FIG. 4B, when the vehicle 1 is turning when the wheel floating state occurs, the turning direction is a reference direction.

Reference is again made to FIG. 3. In S150, the vehicle control device 10 controls the steering angle so that the attitude of the vehicle 1 immediately before the wheel float is generated is maintained. That is, when the attitude (yaw angle) of the vehicle 1 changes by the threshold value or more with the occurrence of the wheel float, the vehicle control device 10 controls the steering angle so as to return to the attitude (yaw angle) of the vehicle 1 before the occurrence of the wheel float. For example, in a case where the vehicle 1 is traveling straight as illustrated in FIG. 4A, the vehicle control device 10 controls the steering angle so that the vehicle 1 faces the straight traveling direction even after the wheels land on the ground. Alternatively, in a case where the vehicle 1 is turning as illustrated in FIG. 4B, the vehicle control device 10 controls the steering angle so that the attitude of the vehicle 1 with respect to the turning direction is maintained even after the wheels land on the ground. After S150, the process proceeds to S160.

In S160, the vehicle control device 10 maintains the steering angle of the vehicle 1. Maintaining the steering angle may mean maintaining the steering angle of the steering wheel so that it does not change, or maintaining the turning angle of the wheel so that it does not change.

In S170, the vehicle control device 10 determines whether the wheel floating state has been eliminated. In S170, as in S120, the determination is performed by using the methods described in Section 2 for detecting the wheel floating state. When the wheel floating state has been eliminated (S170; Yes), the process proceeds to S180. On the other hand, when the wheel floating state continues (S170; No), the process returns to S160.

In S180, the vehicle control device 10 no longer maintains the steering angle of the vehicle 1. As the steering angle is no longer maintained, the driver can steer the vehicle 1 in the same manner as during normal traveling. When the steering angle is no longer maintained, the process ends this time.

As described above, according to the vehicle control device 10, the steering angle of the vehicle 1 is maintained when the wheel floating state occurs. As a result, the vehicle 1 is less likely to be steered in a direction not intended by the driver, and the behavior of the vehicle 1 after landing is less likely to become unstable. Further, since the steering angle is no longer maintained when the wheel floating state is eliminated, the operation of the driver is not hindered.

In addition, in S150, the steering angle is controlled so as to maintain the attitude immediately before the wheel floating state occurs. Thus, even if a change in the yaw angle of the vehicle 1 that is not intended by the driver occurs at a time point before the steering angle is maintained, a sudden change in the attitude of the vehicle 1 after landing can be reduced. In this way, the vehicle 1 can be landed in a safer state.

In the process performed by the vehicle control device 10, the process of S140 and S150 is not essential. That is, the vehicle control device 10 may maintain the steering angle without controlling the steering angle based on the comparison result of the yaw angle while the wheel floating state continues. Even when S140 and S150 processes are not performed, it is possible to prevent the driver from unintentionally steering the vehicle 1 while at least the steering angle is maintained, and thus the vehicle behavior is less likely to become unstable.

2. Detection Method of Wheel Floating State

A method of detecting a wheel floating state will be described with reference to a specific example. Any one of the detection methods described below may be employed, or a plurality of detection methods may be used in combination.

The first example is an example in which each of the plurality of wheels of the vehicle 1 is independently controlled by a steering motor. The vehicle control device 10 determines whether the wheels are in contact with the ground by determining the vertical load of each wheel from the steering angle and the current value of the steering motor.

The vehicle control device 10 acquires a current value flowing through the steering motor. For example, an ammeter is attached to the steering motor, and the vehicle control device 10 acquires an electric current value from the ammeter. Further, the vehicle control device 10 acquires the wheel steering angles of the respective wheels. The wheel steering angle of each wheel is acquired by, for example, the steering angle sensor 23. In this case, the steering angle sensor 23 may be provided in a steering motor that controls each wheel.

Figure 5:
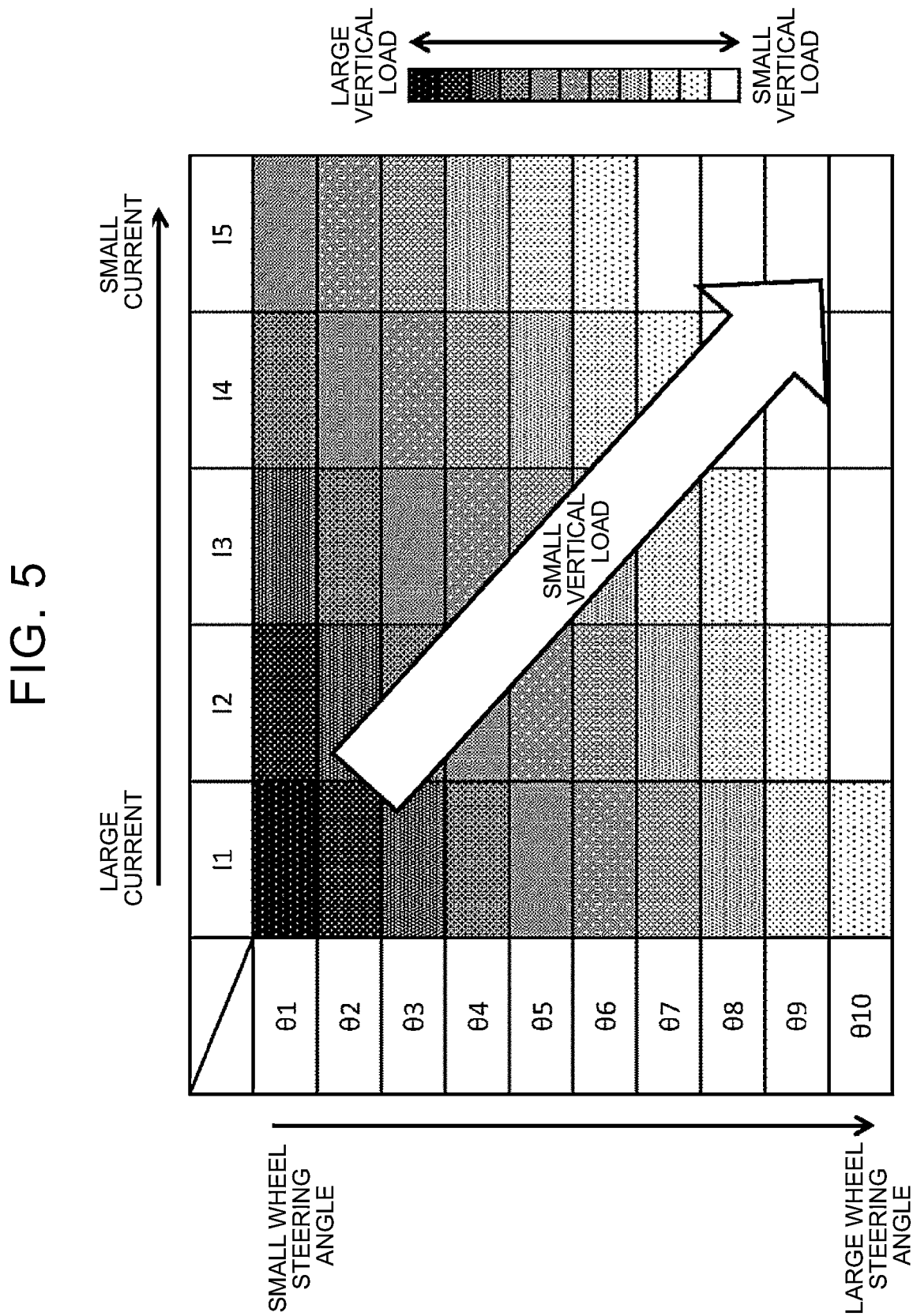
FIG. 5 is a diagram illustrating an example of vertical load information.

The vehicle control device 10 calculates the vertical load of each wheel from the acquired current value and the wheel steering angle based on the "vertical load information". The vertical load information is information indicating a correspondence relationship between a current value flowing through the steering motor, a wheel steering angle, and a vertical for one wheel. FIG. 5 illustrates an example of vertical load information. The magnitude of the current value means the magnitude of the steering force applied to the wheels by the steering motor. When the vertical load is small, the resistance from the road surface becomes small, and thus the change in the wheel steering angle with respect to the current value becomes large. Therefore, the relationship between the current value, the wheel steering angle, and the vertical load can be obtained as the installation load information. The vertical load information is acquired in advance and stored in the storage device 12.

If the calculated vertical load is greater than 0, it indicates that the wheel is in contact with the ground; if the calculated vertical load is less than or equal to 0, it indicates that the wheel is not in contact with the ground. If one or more wheels are present that are not in contact with the ground, it is determined that a wheel floating state has occurred.

In the second method, the wheel floating state is detected by analyzing an image captured by the foot camera of the vehicle-mounted camera 22.

When the wheel floating state occurs, the shape of the wheel and the position of the shadow generated by the wheel change as the wheel touches the ground. For example, when the wheel is in contact with the ground, the ground portion of the wheel is distorted by the load applied to the vehicle body, and thus the lateral width is larger than when the wheel is not in contact with the ground. Also, when the wheels are in contact with the ground and not in contact, the position of the shadow relative to the wheels changes. That is, when the wheel is in contact with the ground, the area occupied by the shadow created by the wheel in the image is not detected because it is in contact with the wheel or is hidden by the wheel. On the other hand, when the wheel moves away from the ground, the area occupied by the shadow of the wheel in the image is detected at a position away from the wheel. In the second method, when these changes are detected by image analysis of an image captured by the camera, it is determined that a wheel floating state has occurred.

In the third method, the wheel floating state is detected by combining the image captured by the foot camera and the information about the suspension stroke detected by the sensors 20.

The vehicle control device 10 performs the following calculation. First, the vehicle control device 10 acquires an image captured by the foot camera, and detects, from the image, a grounding point at which the wheel touches the ground. Further, the vehicle control device 10 calculates the current positional relationship between the wheels and the foot camera from the value of the suspension stroke, and estimates the position of the ground point in the image captured by the foot camera based on the calculated positional relationship. Then, the estimated position of the ground contact point is compared with the actually detected position of the ground contact point, and if these positions do not coincide with each other, it is determined that the wheel is not in contact with the ground. If one or more wheels are present that are not in contact with the ground, it is determined that a wheel floating state has occurred.

In the fourth method, the wheel floating state is detected by idling of the wheels.

The idling of the wheels is detected, for example, as follows. The vehicle control device 10 acquires the wheel speed of each wheel from the wheel speed sensor 24. Further, the vehicle speed of the vehicle 1 is detected from IMU 21. Then, when there is a wheel in which the wheel speed and the vehicle speed are different from each other by the threshold value or more, it is determined that the wheel is not in contact with the ground and is idling. If one or more wheels are present that are not in contact with the ground, it is determined that a wheel floating state has occurred.

Although the detection method is not limited to the above, the above-described example is effective in the following points. If a dedicated sensor is mounted in order to grasp whether or not the wheel is in contact with the ground, the running performance may be deteriorated or the cost may be increased due to an increase in the unsprung weight. By performing detection using an existing sensor or the like as described above, it is advantageous in terms of running performance and cost.

3. Application Examples

Consider a case where a plurality of wheels of the vehicle 1 are controlled independently. In this case, when the wheel floating state occurs, the vehicle control device 10 may further control the following wheels.

Figure 6:
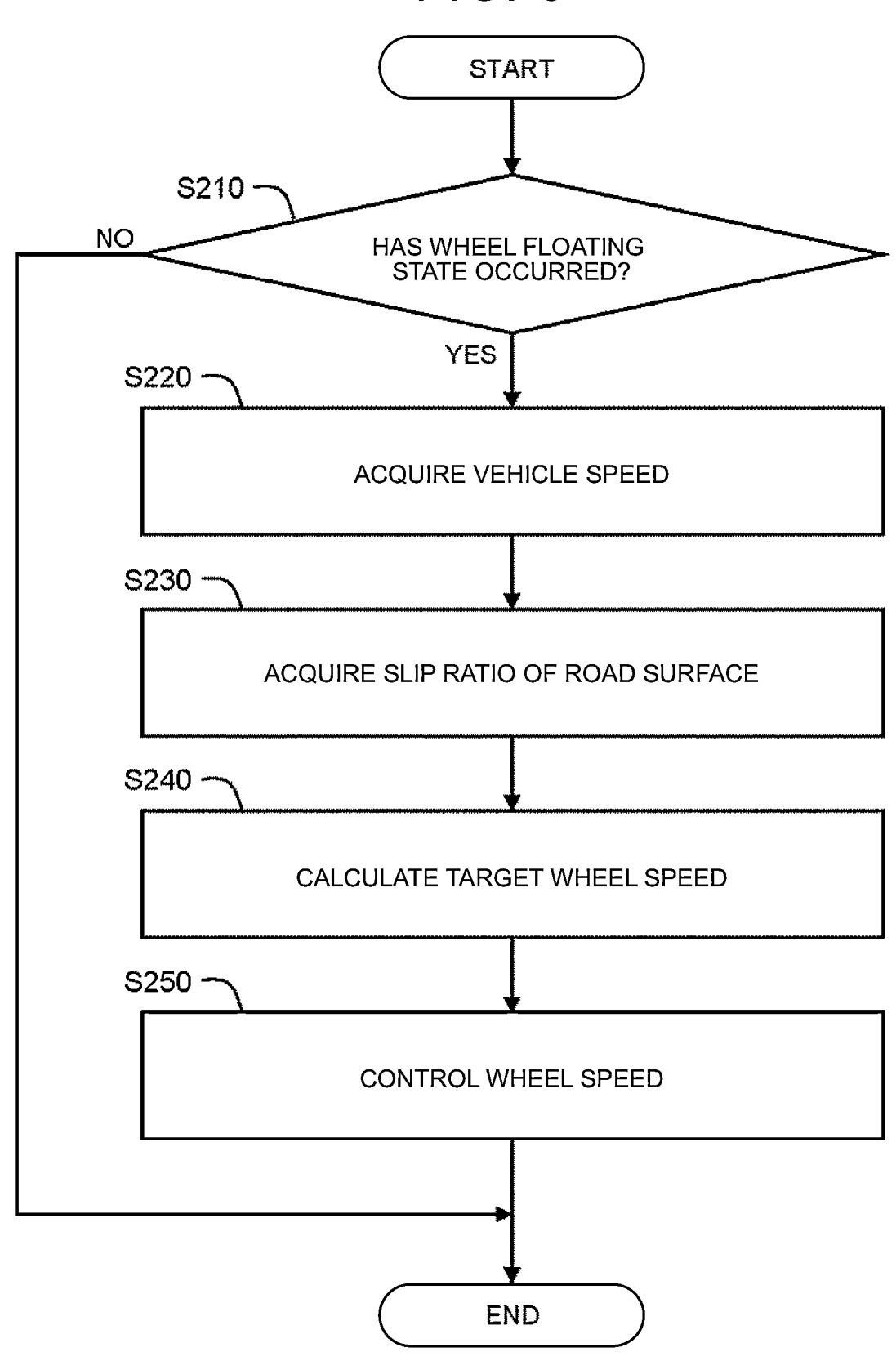
FIG. 6 is a flowchart illustrating an example of processing in the application example.

FIG. 6 is a flowchart illustrating an example of a process executed by the vehicle control device 10 to control wheels.

In S210, the vehicle control device 10 determines whether or not a wheel floating state has occurred. S210 can be determined using the methods described in Section 2. When the wheel floating state has been detected (S210; Yes), the process proceeds to S220. On the other hand, when the wheel floating state does not occur (S210; No), the process ends this time.

In S220, the vehicle control device 10 acquires the vehicle speed of the vehicle 1. The vehicle speed can be obtained from IMU 21.

In S230, the vehicle control device 10 acquires the slip ratio of the road surface in front of the vehicle 1. The vehicle control device 10 can estimate the slip ratio of the road surface, for example, by analyzing an image obtained by the front camera capturing an image of the road surface in front of the vehicle 1.

In S240, the vehicle control device 10 calculates the target wheel speed based on the slip ratio acquired by S230 and the vehicle speed acquired by S220. The target wheel speed is calculated in consideration of the control of the wheel when the wheel lands on the ground. For example, in the case of a road surface such that the slip ratio becomes large, such as sand, the target wheel speed is calculated to be higher than in the case where the slip ratio of the road surface is small in anticipation of the slip of the wheels at the time of landing.

In S250, the vehicle control device 10 controls the wheel speed of the wheel that is not touching the ground to be the target wheel speed. When the wheel speed is controlled, the present process ends.

When a wheel floating state occurs, the wheel speed may be higher than the speed linked to the vehicle speed because the resistance from the road surface is lost. In such a case, when the wheels land as they are, there is a possibility that a catch is generated between the road surface and the wheels, and an excessive input is generated in the drive system. According to the above-described control, such an excessive input can be suppressed.

In addition, the vehicle control device 10 may perform the following control of the wheel steering angle in place of S140 and S150 in FIG. 3. First, the vehicle control device 10 acquires the traveling direction of the vehicle 1 from IMU 21. Then, the wheel steering angle is controlled so that the wheel steering angle of the floating wheel is aligned with the traveling direction of the vehicle 1.

When the wheel floating state occurs, the floating wheels may bend in a direction different from the traveling direction of the vehicle 1 before the steering angle is maintained. In such a case, if the wheels land as they are, excessive input may occur in the steering system. According to the above-described control, such an excessive input can be suppressed.

4. Other Examples

As another example, the wheels of the vehicle 1 may be crawlers. Also in the case where the wheel is a crawler belt, the vehicle control device 10 can detect the crawler belt floating state as in the case of the wheel, and can perform control such as maintaining the steering angle. When a part of the crawler belt is separated from the ground, it is determined that the crawler belt is floating, and the steering angle is maintained.

The vehicle 1 may be an autonomous vehicle. Similarly, when the vehicle 1 is an autonomous vehicle and a wheel floating state occurs during autonomous driving, the vehicle control device 10 performs control to maintain the steering angle when the wheel floating state is detected. In this case, the operation of the driver in the above description may be read as the control by the automatic driving system. While the wheel floating state continues, the control of the steering angle by the vehicle control device 10 is prioritized to the control of the steering angle by the automatic driving, and the steering angle is maintained, and when the wheel floating state is eliminated, the steering by the automatic driving system is enabled.

What is claimed is:

1. A vehicle control device that controls a vehicle, the vehicle control device comprising a processor configured to: acquire information indicating a yaw angle of the vehicle from an inertial measurement unit mounted on a vehicle: determine whether a wheel floating state has occurred, the wheel floating state being a state in which one of a plurality of wheels of the vehicle is not in contact with a ground in a case where the wheel floating state has occurred, determine whether a difference between a first yaw angle of the vehicle before an occurrence of the wheel floating state and a second yaw angle of the vehicle after the occurrence of the wheel floating state is less than or equal to a predetermined value, in a case where the difference is more than the predetermined value, control a steering angle of the vehicle so as to return to the first yaw angle of the vehicle before the occurrence of the wheel floating state: and in a case where the difference is less than or equal to the predetermined value, maintain the steering angle of the vehicle while the wheel floating state continues, wherein wheel speeds of the wheels are independently controllable, and the vehicle control device is configured to, in a case where the wheel floating state has occurred, acquire a vehicle speed of the vehicle, acquire an image of a road surface in front of the vehicle from a camera mounted on the vehicle, estimate a slip ratio of the road surface by analyzing the captured image, calculate a target wheel speed based on the wheel speed and the slip ratio, wherein the target wheel speed is calculated to be higher as the slip ratio becomes larger, and independently control the wheel speed of a wheel that is not in contact with the ground out, among the wheels, to the target wheel speed, before the wheel floating state is eliminated.

2. The vehicle control device according to claim 1, wherein, when the wheel floating state occurs, before maintaining the steering angle, further perform a process for controlling the steering angle in such a manner that an attitude of the vehicle immediately before occurrence of the wheel floating state is maintained.

3. The vehicle control device according to claim 1, wherein the processor is configured to increase a wheel speed of the wheel that is not in contact with the ground in a case where the road surface is sand.

4. A vehicle control device that controls a vehicle, the vehicle control device comprising a processor configured to: acquire information indicating a yaw angle of the vehicle from an inertial measurement unit mounted on a vehicle: determine whether a wheel floating state has occurred, the wheel floating state being a state in which one of a plurality of wheels of the vehicle is not in contact with a ground in a case where the wheel floating state has occurred, determine whether a difference between a first yaw angle of the vehicle before an occurrence of the wheel floating state and a second yaw angle of the vehicle after the occurrence of the wheel floating state is less than or equal to a predetermined value, in a case where the difference is more than the predetermined value, control a steering angle of the vehicle so as to return to the first yaw angle of the vehicle before the occurrence of the wheel floating state: and in a case where the difference is less than or equal to the predetermined value, maintain the steering angle of the vehicle while the wheel floating state continues, wherein wheel steering angles of the wheels are independently controlled by a steering motor, the vehicle control device includes a storage device that stores vertical load information, the vertical load information indicating correspondence between a current value flowing through the steering motor and the wheel steering angle of one of the wheels and a vertical load of the one wheel, and the process for determining whether the wheel floating state has occurred includes, for each of the wheels, acquiring the current value, acquiring the wheel steering angle, and determining that the wheel floating state has occurred, when the vertical load for one of the wheels is equal to or less than a threshold value based on the acquired current value, the acquired wheel steering angle, and the vertical load information.

5. A vehicle control method for controlling a vehicle, the method comprising: acquiring information indicating a yaw angle of the vehicle from an inertial measurement unit mounted on a vehicle determining whether a wheel floating state has occurred, the wheel floating state being a state in which one of a plurality of wheels of the vehicle is not in contact with a ground; in a case where the wheel floating state has occurred, determining whether a difference between a first yaw angle of the vehicle before an occurrence of the wheel floating state and a second yaw angle of the vehicle after the occurrence of the wheel floating state is less than or equal to a predetermined value in a case where the difference is more than the predetermined value, controlling a steering angle of the vehicle so as to return to the first yaw angle of the vehicle before the occurrence of the wheel floating state: and in a case where the difference is less than or equal to the predetermined value, maintaining the steering angle of the vehicle while the wheel floating state continues, wherein wheel speeds of the wheels are independently controllable, and the method further comprises, in a case where the wheel floating state has occurred, acquiring a vehicle speed of the vehicle, acquiring an image of a road surface in front of the vehicle from a camera mounted on the vehicle, estimating a slip ratio of the road surface by analyzing the captured image, calculating a target wheel speed based on the wheel speed and the slip ratio, wherein the target wheel speed is calculated to be higher as the slip ratio becomes larger, and independently controlling the wheel speed of a wheel that is not in contact with the ground out, among the wheels, to the target wheel speed, before the wheel floating state is eliminated.

6. The vehicle control method according to claim 5, further comprising increasing a wheel speed of the wheel that is not in contact with the ground in a case where the road surface is sand.

* * * * *